Nov. 7, 1933.            I. HARTER                1,934,667
                      FLUID PRESSURE SYSTEM
                      Filed Aug. 28, 1930        2 Sheets-Sheet 1

INVENTOR
ISAAC HARTER
BY
ATTORNEY

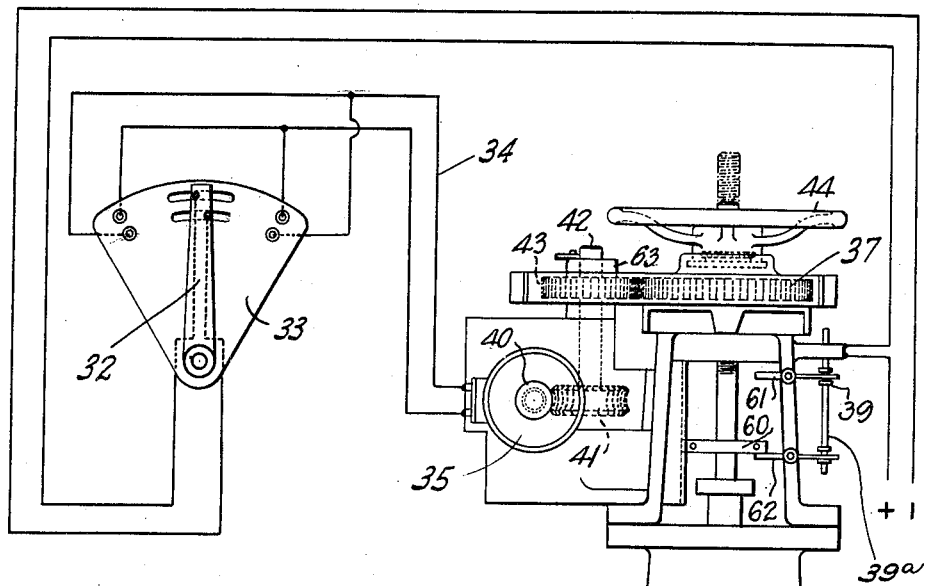
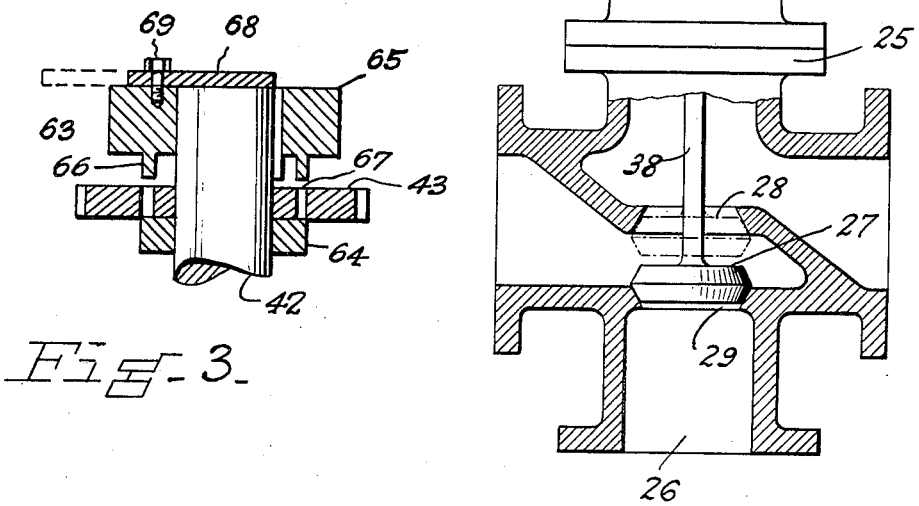

Patented Nov. 7, 1933

1,934,667

UNITED STATES PATENT OFFICE 1,934,667

FLUID PRESSURE SYSTEM

Isaac Harter, New York, N. Y., assignor to Bailey Meter Company, a corporation of Delaware Application August 28, 1930. Serial No. 478,524

9 Claims. (Cl. 60—1)

This invention relates to fluid pressure systems such, for example, as steam systems and more particularly to control devices for use in connection therewith.

An object of this invention is to provide an improved control mechanism of the type set forth, constructed and arranged to automatically regulate the operation of an associated system.

This and other objects which will be apparent to those skilled in this particular art are accomplished by means of the invention illustrated in the accompanying drawings in which;

Fig. 2 is a transverse sectional view partly broken away of a control valve together with the associated mechanism for operating the same; and Fig. 3 is a sectional elevation of a clutch mechanism.

Figure 1:
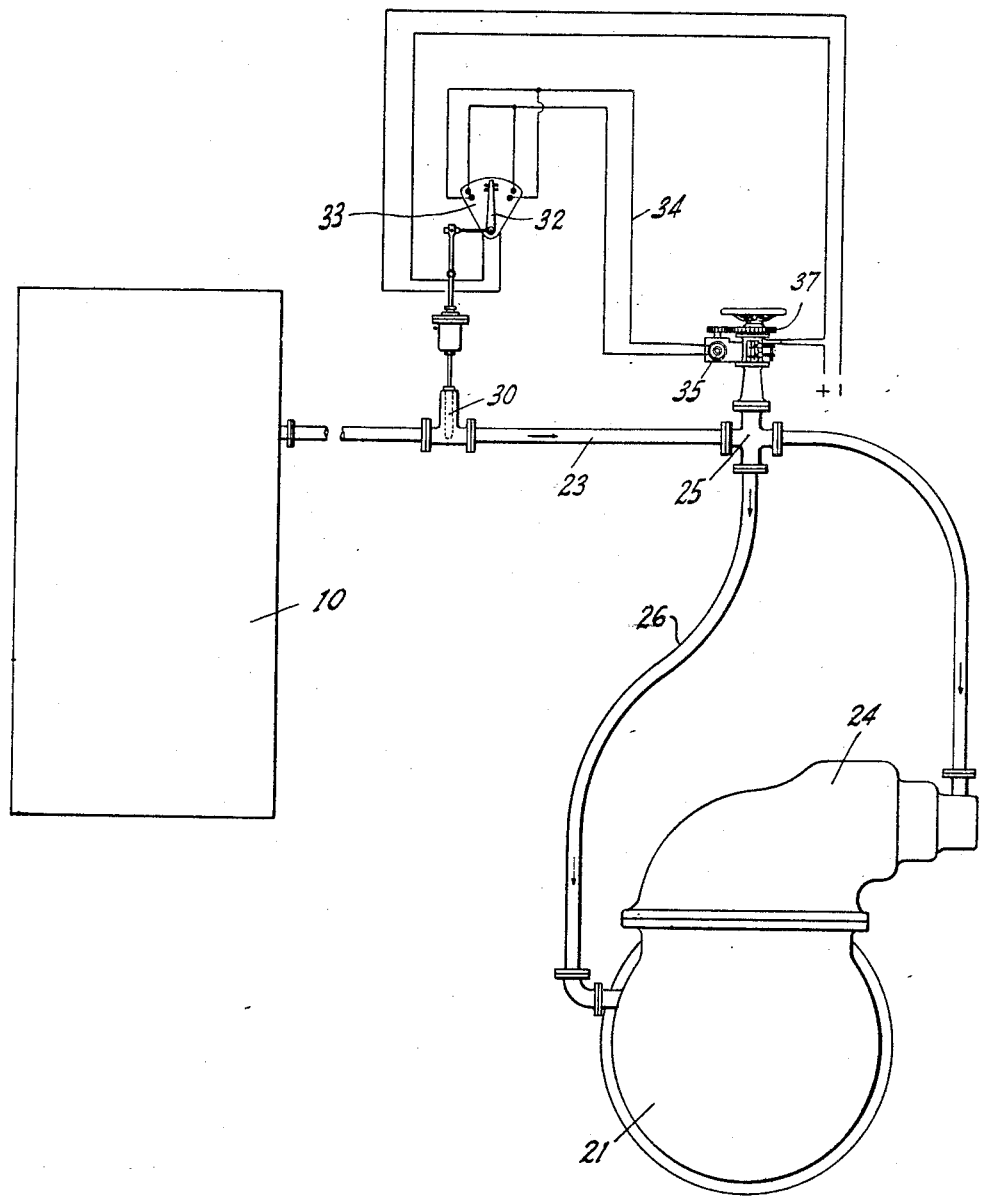
Fig. 1 is a diagrammatic layout of a steam system arranged in accordance with one embodiment of this invention.

The particular embodiment of the present invention which has been shown for the purposes of illustration is shown in connection with a steam system but it will be apparent that the invention is equally applicable to other forms of vapor or fluid pressure systems.

As illustrated, any desired source of steam 10 is connected to a steam main 23 or other connection for conveying the operating steam to a steam consuming unit 24 such as a turbine or the like.

The present invention contemplates the provision of mechanism for insuring that the steam delivered to the turbine comes within the desired temperature range and that no steam of either too high a temperature or too low a temperature reaches the turbine or other steam consuming unit. As illustrated, this mechanism includes a valve 25 inserted in the main 23 and connected to a by-pass outlet 26 which may lead to a condenser 21 or any other apparatus. The valve housing 25 is provided with a valve 27 adapted to control the flow of fluid through the line 23 and either to permit it to flow through such line to the turbine 24 through the valve port 28 or to close such port so as to open the by-pass port 29 leading to the line 26.

The by-pass position of the valve 27 is shown in dotted lines in Fig. 2 while the normal position, permitting operation of the turbine 24 is illustrated in full lines.

In the illustrated embodiment, the valve is operated by means of a thermostat 30 located in the connection 23 and subject to variations in the temperature of the steam flowing therethrough. The thermostat is of standard construction and is connected by well known mechanism to a bell-crank lever, one arm 32 of which forms part of an electric switch 33 for controlling the flow of current through lines 34 leading to a motor 35. The armature of the motor 35 is connected to a spur gear 37 which is threaded to the upper portion of the valve stem 38 on which the valve 27 is mounted, through a worm 40, worm wheel 41 and spur gear 43, the latter driven by shaft 42 through a suitable clutch means 63.

In Fig. 3 I have shown in sectional elevation and to an enlarged scale, the clutch means 63. It is to be understood that the means I have disclosed is purely illustrative and any clutch such as is known in the art may be employed. Referring to Fig. 3, the spur gear 43 is supported by a stationary collar 64 and loosely fits the shaft 42. The clutch proper consists of a collar 65 splined to the shaft 42 so that while it is rotated by the shaft it may be moved longitudinally. The collar 65 is provided with a plurality of fingers 66 adapted to enter suitably disposed holes 67 in the spur gear 43. The fingers 66 are held out of driving engagement with the gear 43 by means of a disc 68 rotatable about a pin 69 which is fastened to the collar 65. When it is desired to manually operate the valve through the handwheel 44, the collar is held in the position shown in Fig. 3 by the disc 68 which is moved over the end of the shaft 42. When it is desired that the valve be automatically operated, the disc 68 is rotated to the position shown by dotted line, so that the collar 65 may be moved longitudinally relative the shaft 42 until the fingers 66 mesh with the holes 67 for driving therethrough. Thereafter any motion of the shaft 42 will be transmitted to the gear 43 and consequently to the valve 25.

The switch 33 controls the flow of current through the lines 34 and, hence, the operation of the motor, and the switch in turn is controlled through the thermostat by the temperature of the steam flowing to the turbine 24. Assuming the valve 27 to be in normal operating position as shown in full lines in Fig. 2, the thermostat is so designed that a drop in the temperature of the steam, below a predetermined point will operate the switch 32 so as to cause current to flow through the motor 35 to rotate gear 37 and raise valve 27 to open the by-pass connection 26 and close the port 28, thus shutting off the flow of low temperature steam to the turbine. A suitable motor cutout 39 is arranged to stop the operation of the motor when the valve 28 reaches its uppermost position. The motor cut-out illustrated consists of a finger 60 carried on the valve stem 38 and arranged to raise or lower a contact carrying rod 39ª, to close or open, respectively, the motor circuit. When the valve reaches its upper position, the finger 60 actuates a pivoted bar 61, loosely engaging the rod 39ª, to lower the rod and thereby open the motor circuit. When the valve is manually returned to its lower position, the finger 60 actuates a second bar 62, at the lower limit of movement of the finger, to raise the rod 39ª to its circuit closing position, thus restoring the motor circuit to the control of the switch 33. In the same way, an increase in the temperature of the steam above a predetermined point will operate the thermostat so as to move the switch lever 32 in the opposite direction so as to send current through the lines and operate the motor 35 in the manner above described. It will be understood that return of the steam temperature to the desired range operates the thermostat so as to open the switch 33. The valve 27 is returned to normal position, in which the by-pass port 29 is closed and the port 28 opened, by hand, after which it will again be automatically operated to close port 28 and open the by-pass should the steam in the line 23 again be above or below the desired temperature range.

The specific details of the relay 39 and similar mechanisms have not been described in detail as any standard form of control can be employed.

What I claim as new, and desire to secure by Letters Patent, is:

1. The combination with a steam consuming unit of a steam generator, a connection for conveying steam from said generator to said unit, a valve in said connection, a thermostat associated with said connection and means controlled by said thermostat for closing said valve when the temperature of said steam rises above or falls below certain predetermined points.

2. The combination with a steam consuming unit of a steam generator, a connection for conveying steam from said generator to said unit, a by-pass, a valve for opening and closing said by-pass, a thermostat subject to the steam temperature in said connection and means controlled by said thermostat for operating said valve to open said by-pass and close said connection when said temperature rises above or falls below a predetermined range.

3. The combination with a steam turbine, of a steam source, a connection for conveying steam from said source to said turbine, a by-pass, a valve for controlling the flow through said connection and said by-pass, a thermostat subject to the temperature of steam in said connection, and means controlled by said thermostat for operating said valve to open said by-pass and close said connection when said temperature falls below a predetermined point.

4. The combination with a steam turbine, of a steam generator, a connection for conveying steam from said generator to said turbine, a condenser associated with said turbine, a by-pass from said connection to said condenser, a valve for controlling flow of steam through said connection and said by-pass, a thermostat subject to the temperature of steam in said connection, and means controlled by said thermostat for operating said valve to open said by-pass and close said connection when said temperature rises above or falls below a predetermined operating range.

5. The combination, with a vapor operated mechanism, of a vapor generator, a connection for conveying vapor from said generator to said mechanism, a valve controlled bypass connection located in said vapor connection between said vapor operated mechanism and said vapor generator, and valve operating mechanism controlled by the vapor temperature in said vapor connection, adapted to operate the valve in said bypass and shut off vapor from said vapor operated mechanism when the vapor temperature reaches predetermined high and low limits.

6. The combination, with a vapor operated mechanism, of a vapor generator connection for conveying vapor from said generator to said mechanism, a bypass connection located in said vapor connection between said vapor operated mechanism and said vapor generator, and means associated with said bypass connection adapted to shut off vapor from said vapor operated mechanism when the vapor temperature reaches predetermined high and low limits.

7. The combination of a vapor operated mechanism, of a vapor generator, a connection for conveying vapor from said generator to said mechanism, a valve controlled bypass connection located in said vapor connection between said vapor operated mechanism and said vapor generator, and a valve operating mechanism controlled by the vapor temperature in said vapor connection comprising a thermostatically controlled switch and an electric motor which are adapted to operate the valve in said bypass and shut off vapor from said vapor operated mechanism when the vapor temperature reaches predetermined high and low limits.

8. The combination with a steam generator, of a steam consuming device, a steam supply conduit connecting said generator and device, and mechanism for by-passing steam about said device when the steam temperature rises above or falls below a predetermined operating range.

9. The combination with a steam generator, of a steam consuming device, a steam supply conduit connecting said generator and device, a by-pass about said device, a valve controlling said conduit and by-pass, and automatic temperature responsive mechanism for opening said by-pass when the steam temperature rises above or falls below a predetermined operating range, and manually operated means for moving said valve to its by-pass closing position.

ISAAC HARTER.